US010885281B2

(12) United States Patent
Stoyanovsky et al.

(10) Patent No.: US 10,885,281 B2
(45) Date of Patent: Jan. 5, 2021

(54) NATURAL LANGUAGE DOCUMENT SUMMARIZATION USING HYPERBOLIC EMBEDDINGS

(71) Applicant: International Business Machines Corporation, Armonk, NY (US)

(72) Inventors: Anastas Stoyanovsky, Pittsburgh, PA (US); Steven M. Pritko, Pittsburgh, PA (US); Robert L. Yates, Arlington, MA (US); Angela Swindell, Austin, TX (US); Adilakshmi Veerubhotla, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/212,194

(22) Filed: Dec. 6, 2018

(65) Prior Publication Data
US 2020/0184012 A1    Jun. 11, 2020

(51) Int. Cl.
*G06F 17/27* (2006.01)
*G06F 40/30* (2020.01)
*G06F 40/205* (2020.01)

(52) U.S. Cl.
CPC ............ *G06F 40/30* (2020.01); *G06F 40/205* (2020.01)

(58) Field of Classification Search
CPC ........ G06F 16/285; G06F 16/35; G06F 16/38; G06F 16/2246; G06F 16/24578; G06F 16/322; G06F 16/9027; G06F 16/14; G06F 16/24; G06F 16/26; G06F 16/33; G06F 16/335; G06F 16/43; G06F 16/532;
(Continued)

(56) References Cited

U.S. PATENT DOCUMENTS

| 5,590,250 A | 12/1996 | Lamping et al. |
| 5,907,836 A * | 5/1999 | Sumita .................... G06F 16/30 707/754 |

(Continued)

OTHER PUBLICATIONS

Dhingra et al ("Embedding Text in Hyperbolic Spaces", Carnegie Mellon University, GoogleTM Brain, pp. 1-11, Jun. 12, (Year: 2018).*
Cho, Hyunghoon et al., "Large-Margin Classification in Hyperbolic Space", arXiv preprint arXiv:1806.00437, Jun. 1 2018, 14 pages.
Dhingra, Bhuwan et al., "Embedding Text in Hyperbolic Spaces", Proceedings of the Twelfth Workshop on Graph-Based Methods for Natural Language Processing (TextGraphs-12), pp. 59-69 New Orleans, Louisiana, Jun. 6, 2018.

(Continued)

*Primary Examiner* — Leshui Zhang
(74) *Attorney, Agent, or Firm* — Francis Lammes; Stephen J. Walder, Jr.; Ingrid M. Foerster

(57) ABSTRACT

A mechanism is provided to implement a summarization mechanism for summarizing an identified natural language document using hyperbolic embeddings. Responsive to receiving a query from a user for a summarization of the identified natural language document, the summarization mechanism produces a hyperbolic embedding model of embeddings of the query. The summarization mechanism compares the embeddings of the query to each of a set of embeddings associated with a set of sentences of the identified natural language document. Responsive to identifying a subset of embeddings associated with the set of sentences of the identified natural language document having a semantic specificity to a subset of embeddings associated with the query, the summarization mechanism adds the sentence to a summary of the identified natural language document. The summarization mechanism then outputs the summary to the user.

15 Claims, 3 Drawing Sheets

(58) Field of Classification Search
CPC ...... G06F 16/632; G06F 16/73; G06F 16/835;
G06F 16/903; G06F 16/953; G06F
16/951; G06F 16/2452; G06F 16/24534;
G06F 40/20; G06F 40/205; G06F 40/211;
G06F 40/216; G06F 40/221; G06F
40/226; G06F 40/232; G06F 40/237;
G06F 40/242; G06F 40/247; G06F
40/253; G06F 40/258; G06F 40/263;
G06F 40/268; G06F 40/279; G06F
40/284; G06F 40/289; G06F 40/295;
G06F 40/30; G06F 40/35; G06F 40/40;
G06F 40/42; G06F 40/44; G06F 40/45;
G06F 40/47; G06F 40/49; G06F 40/51;
G06F 40/53; G06F 40/55; G06F 40/56;
G06F 40/58
USPC ...... 704/9, 1–7, 10; 707/740, 749, 752, 754,
707/E17.09, 750, 769–780
See application file for complete search history.

(56) References Cited

U.S. PATENT DOCUMENTS

| | | |
|---|---|---|
| 10,019,525 B1 | 7/2018 | Boni et al. |
| 2005/0222973 A1* | 10/2005 | Kaiser ..................... G06F 16/93 |
| 2018/0096061 A1 | 4/2018 | Seuss et al. |

OTHER PUBLICATIONS

Nickel, Maximilian et al., "PoincaréEmbeddings for Learning Hierarchical Representations", arXiv: 1705.08039v2 [cs.AI] May 26, 2017, 10 pages.

Tay, Yi et al., "Hyperbolic Representation Learning for Fast and Efficient Neural Question Answering", WSDM 2018, Feb. 5-9, 2018, Marina Del Rey, CA, USA, 9 pages.

* cited by examiner

NATURAL LANGUAGE DOCUMENT SUMMARIZATION USING HYPERBOLIC EMBEDDINGS

BACKGROUND

The present application relates generally to an improved data processing apparatus and method and more specifically to mechanisms for summarizing a natural language document using hyperbolic embeddings.

Hyperbolic embeddings have captured the attention of the machine learning community. The motivation is to embed structured, discrete objects such as knowledge graphs into a continuous representation that may be used with modern machine learning methods. Hyperbolic embeddings may preserve graph distances and complex relationships in very few dimensions, particularly for hierarchical graphs.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided, in a data processing system comprising at least one processor and at least one memory, the at least one memory comprising instructions that are executed by the at least one processor to cause the at least one processor to be configured to implement a summarization mechanism for summarizing an identified natural language document using hyperbolic embeddings. The method comprises, responsive to receiving a query from a user for a summarization of the identified natural language document, producing, by the summarization mechanism, a hyperbolic embedding model of embeddings of the query. The method also comprises comparing, by the summarization mechanism, the embeddings of the query to each of a set of embeddings associated with a set of sentences of the identified natural language document. Additionally, the method comprises, responsive to identifying a subset of embeddings associated with the set of sentences of the identified natural language document having a semantic specificity to a subset of embeddings associated with the query, adding, by the summarization mechanism, the sentence to a summary of the identified natural language document. Moreover, the method comprises outputting, by the summarization mechanism, the summary to the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
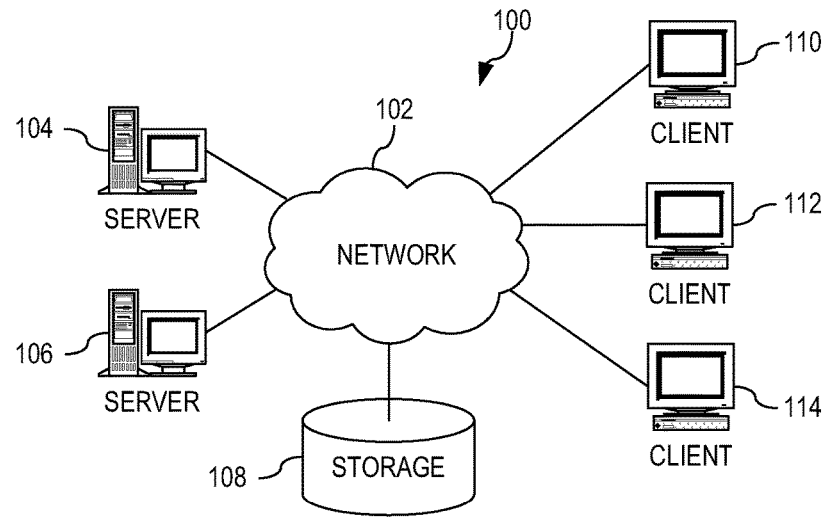
FIG. 1 is an example diagram of a distributed data processing system in which aspects of the illustrative embodiments may be implemented.

As stated previously, hyperbolic embeddings have captured the attention of the machine learning community. The motivation is to embed structured, discrete objects such as knowledge graphs into a continuous representation that may be used with modern machine learning methods. One example is embedding taxonomies (such as Wikipedia categories, lexical databases like WordNet, and phylogenetic relations). The big goal when embedding a space into another is to preserve salient structures, such as the hierarchy of terms in WordNet, or even to perform the embedding such that latent structure is rigorously encoded, such as in the case of hyperbolic embeddings. It turns out that hyperbolic space may better embed graphs (particularly hierarchical graphs like trees) than is possible in Euclidean space. Even better—angles in the hyperbolic world are the same as in Euclidean space, suggesting that hyperbolic embeddings are useful for downstream applications (and not just a quirky theoretical idea). However, when generating a summary of a natural language document, traditional extractive text summarization methods rely on information retrieval based on a measure of similarity between a given query and sentences identified in a document in order to classify particular sentences contained with the document as either relevant or not relevant to the query, then extracting those sentences of the document classified as relevant to the query in order to concatenate them into a summary of the document. Thus, these traditional extractive text summarization methods merely rely on text matching without regard to sentence structure.

The illustrative embodiments provide summarization mechanism that improve on these traditional extractive text summarization methods and that differs fundamentally because the summarization mechanism of the illustrative embodiments summarizes natural language document using hyperbolic embeddings not only in the natural language document but hyperbolic embeddings in the received query. That is, the illustrative embodiments effectively inspect particular clauses within a sentence of the natural language document, using its representation in hyperbolic space, to evaluate its semantic similarity to a query received from a user, using its representation in hyperbolic space. For example, a sentence which contains a series of clauses or phrases of which only one is relevant to a query may be missed using the traditional extractive text summarization methods described above. More precisely, a sentence may be deemed less relevant than another sentence which has more clauses or phrases but in which each of those clauses or phrases are only weakly relevant. In contrast, in the illustrative embodiments, the summarization mechanism may recognize a single clause or phrases out of a set of clauses or phrases in a sentence as relevant to the query and thus, the summarization mechanism extracts the sentence comprising the clause or phrase. This approach goes beyond classification of sentences of the natural language document as in the traditional extractive text summarization methods because the summarization mechanism is, in principle, able to reason about the semantic content of sentences in order to recognize whether a particular clause of a sentence is related to a particular query and then extract that sentence in order to produce a summary that comprises the sentence.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
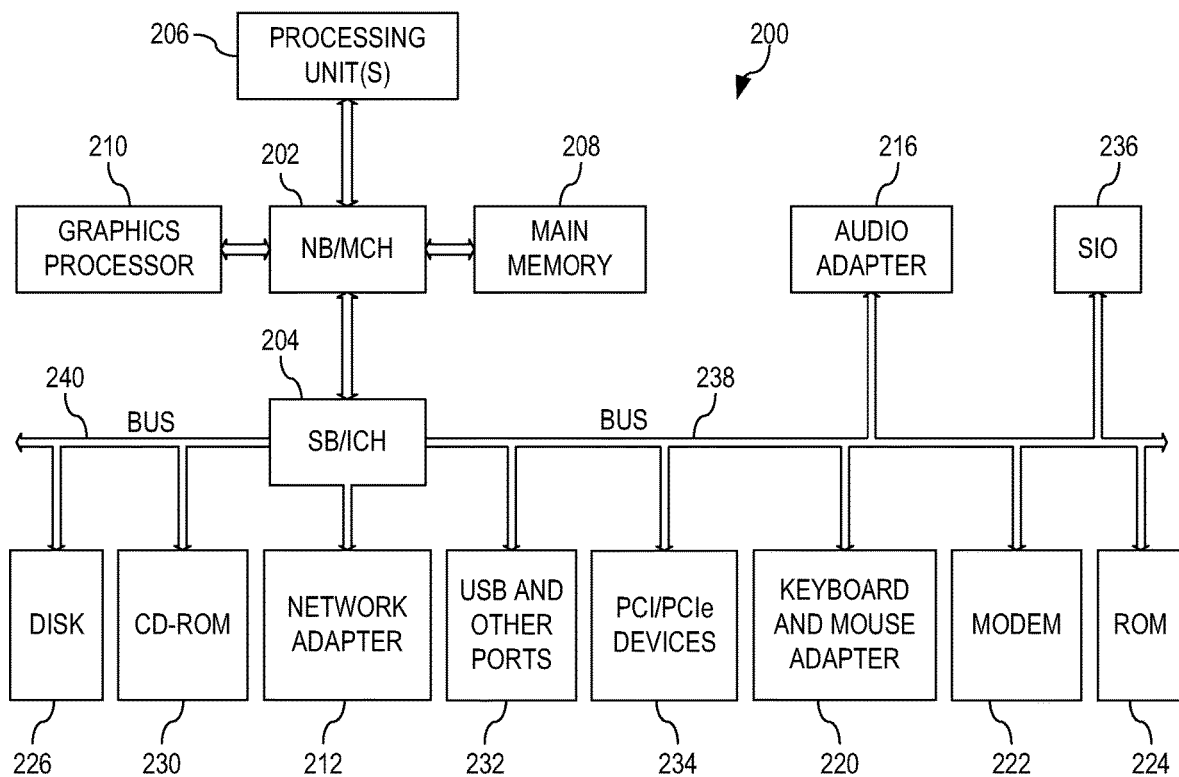
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a summarization mechanism that summarizes a natural language document using hyperbolic embeddings. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates summarizing a natural language document using hyperbolic embeddings.

As noted above, the mechanisms of the illustrative embodiments utilize specifically configured computing devices, or data processing systems, to perform the operations for summarizing a natural language document using hyperbolic embeddings. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to summarizing a natural language document using hyperbolic embeddings.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
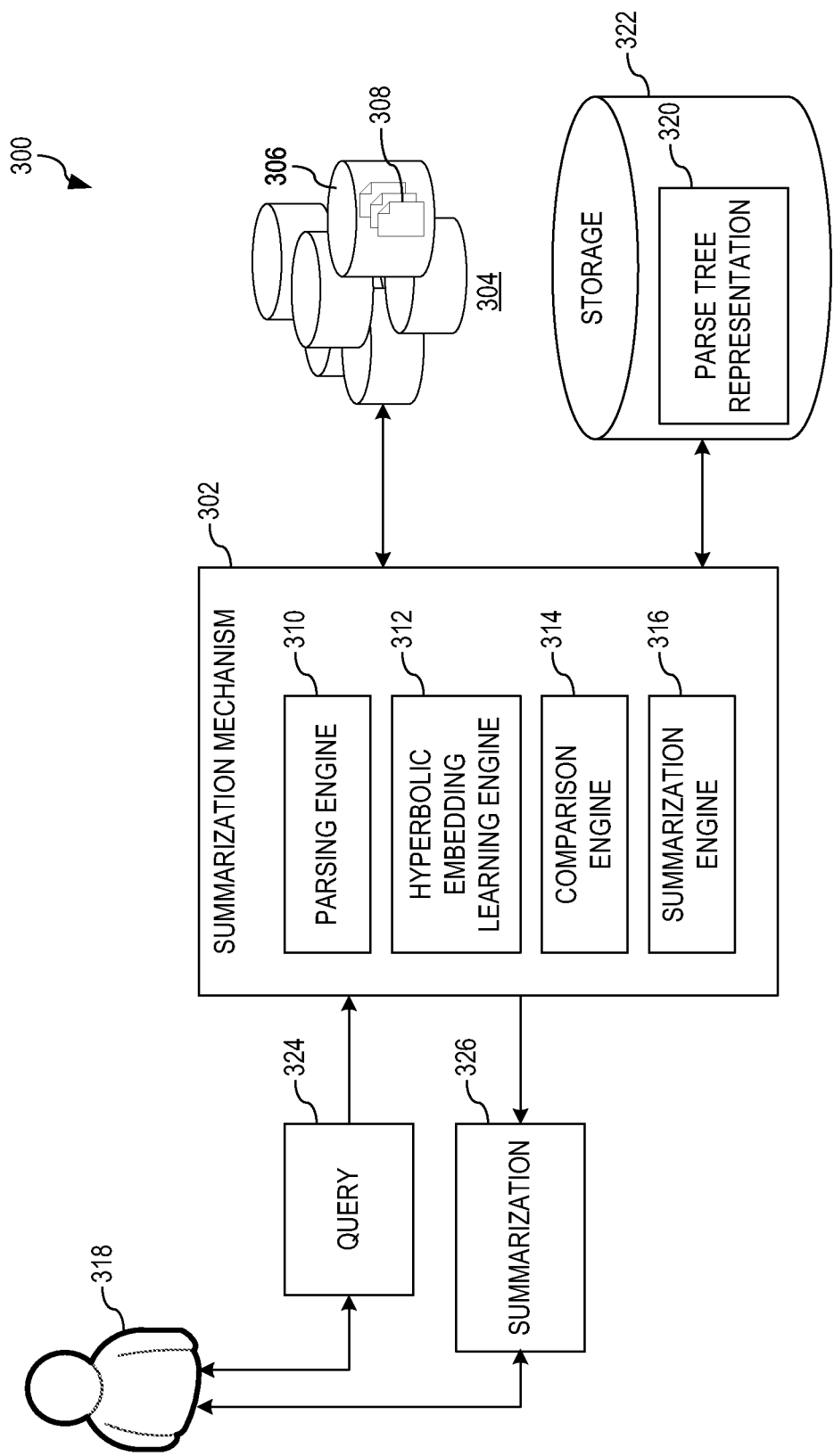
FIG. 3 depicts an exemplary functional block diagram of a summarization mechanism that summarizes a natural language document using hyperbolic embeddings in accordance with an illustrative embodiment.

FIG. 3 depicts an exemplary functional block diagram of a summarization mechanism that summarizes a natural language document using hyperbolic embeddings in accordance with an illustrative embodiment. Data processing system 300 comprises summarization mechanism 302 and corpora of data information 304. Corpora 304 comprise information about the electronic texts, documents, articles, websites, and the like, all in a natural language format. That is, these various sources themselves, different collections of sources, and the like, represent a different corpus 306 within the corpora 304. There may be different corpora 304 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 306 within the corpora 304 and, as such, each corpus 306 comprises one or more electronic texts, documents, articles, websites, and the like, all in a natural language format, hereinafter referred to simply as natural language documents 308.

In order to summarize a natural language document using hyperbolic embeddings, summarization mechanism 302 comprises parsing engine 310, hyperbolic embedding learning engine 312, comparison engine 314, and summarization engine 316. During initialization, based on an identification of a specific corpus 306 from user 318, parsing engine 310, which may be a dependency parsing engine, constituency parsing engine, frame-semantic parsing, or the like, performs a parse on each natural language document 308 in specific corpus 306 and stores a corresponding parse tree representation 320 of each sentence in a set of sentence associated with each natural language document 308 in storage 322.

For each parse tree representation 320 of the set of sentences of each natural language document 308, hyperbolic embedding learning engine 312 produces a model of the hyperbolic space based on the hyperbolic embeddings of the set of sentences. That is, summarization mechanism 302 takes advantage of hyperbolic embeddings modeling as described by Dhingra et al. in Embedding Text in Hyperbolic Spaces (2018), which is hereby incorporated by reference, such that hyperbolic embedding learning engine 312 performs unsupervised hyperbolic embeddings training on natural language parse trees in parse tree representation 320 of each of the set of sentences of each natural language document 308 to generate a hyperbolic embedding model of embeddings of each sentence of the set of sentences of each natural language document 308. Hyperbolic embedding learning engine 312 also performs unsupervised hyperbolic embeddings training of each particular phrase and/or clause within parse tree representation 320 of each of the set of sentences in order to generate clause-level embeddings and/or phrase-level embeddings for query matching. Specifically, every subtree of parse tree representation 320 is embedded.

Summarization mechanism 302 then receives query 324 from user 318 that identifies a set of keywords or natural language phrase for which a summarization is to be produced as well as an identification of a particular natural language document of natural language documents 308 in corpus 306 for which the summarization is to be performed. Upon receiving query 324, hyperbolic embedding learning engine 312 utilizes the previously generated hyperbolic embedding model associated with the identified natural language document on query 324 to produce a hyperbolic embedding model of embeddings of query 324. Once the hyperbolic embedding model of query 324 is generated, comparison engine 314 compares the embeddings for query 324 to each of the embeddings of the set of sentences, phrases, and/or clauses of the identified natural language document 308. Specifically, comparison engine 314 identifies those embeddings of the sentences, phrases, and/or clauses of the set of sentences of the identified natural language document 308 that have a semantic specificity to the embeddings of query 324 within a specificity threshold.

In order to exemplify the above process consider the following three sentences:

Sentence S1="Automobiles of Automaker A are often compared to automobiles of Automaker B in terms of safety."

Sentence S2="When discussing these measures, the safety ratings of Automaker A rank highly."

Sentence S3="Now that we are done discussing the poor safety ratings of automobile made in Country A, let's turn to automobile made in Country B, such as automobiles of Automaker A."

Upon receiving a query that requests a summary of a specified document based on an identified topic of "Safety of an automobile from Automaker A," traditional extractive text summarization methods tend to match any sentence that contains anywhere within itself "Automaker A" and "safety." In particular, both S1 and S2 will match the query using these techniques because the sentence contains both words, even though S2 may be more relevant to the query. N-gram features will also fail to pick up on the qualitative difference between S1 and S2, and the situation is similar in the usual case of word or sentence embeddings because they incorporate no information at the level of constituency parsing, i.e., they are unable to detect the semantic similarity between "safety of an automobile from Automaker A" and the specific clause within S2 that is "the safety ratings of Automaker A rank highly". Sentence S3 is even more unrelated to the query, but will still tend to be considered relevant to the query by at least most traditional extractive text summarization methods. Word-level or sentence-level Euclidean embeddings may be able to distinguish S3 with some tuning, but they are fundamentally unable to recognize that "Automaker A" and "safety" occur in entirely different clauses within S3.

In accordance with the illustrative embodiments, summarization mechanism 302 utilizes the hyperbolic embedding based approach described above to identify one or more clauses of a sentence with a degree of semantic specificity similar to that of the query. In the example, both S1 and S2 would still match to some degree, but S2 would be preferred over S1 because the clause "the safety ratings of Automaker A" within "the safety ratings of Automaker A rank highly" has a degree of semantic specificity that matches strongly with the semantic specificity of the query "Safety of an automobile from Automaker A" based on the applied specificity threshold. In contrast, the hyperbolic embedding approach provided by summarization mechanism 302 would not strongly consider S3 as a candidate, again based on the semantic specificity of the query as related to clauses within S3, which is a qualitative difference in reasoning that leads to qualitatively different output.

In one embodiment, the specificity threshold is defined by the user 318. That is, the specificity threshold may be percentage threshold and the number of matches between hyperbolic embeddings in a particular sentence in the identified natural language document 308 and the hyperbolic embeddings in query 324 must meet or exceed the identified percentage threshold. In another embodiment, the specificity threshold may be a dynamic threshold. That is, user 318 may desire a one page summary of an identified natural language document 308 that spans multiple pages. Thus, the specificity threshold may be initially set to a percentage that is equal to number of desired pages for the summary divided by the number of pages within the identified natural language document 308. However, if summarization mechanism 302 identifies a number of sentences that meet or exceed the specificity threshold that would cause the summarization to exceed the number of desired pages for the summary, then summarization my dynamically increase the specificity threshold to curate the number of identified sentences such that the summary will meet the number of desired pages for the summary. Conversely, if summarization mechanism 302 identifies a number of sentences that fail to meet the specificity threshold that would cause the summarization to miss the number of desired pages for the summary, then summarization my dynamically decrease the specificity threshold to increase the number of identified sentences such that the summary will meet the number of desired pages for the summary.

Regardless of which specificity threshold is utilized, once comparison engine 314 identifies a set of sentences, phrases, and/or clauses of the identified natural language document 308 that match query 324 within the specificity threshold, summarization engine 316 extracts the sentences identified by comparison engine 314 and concatenates the sentences together so as to produce summarization 326 of the identified natural language document 308. Summarization engine 316 then outputs summarization 326 to user 318.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
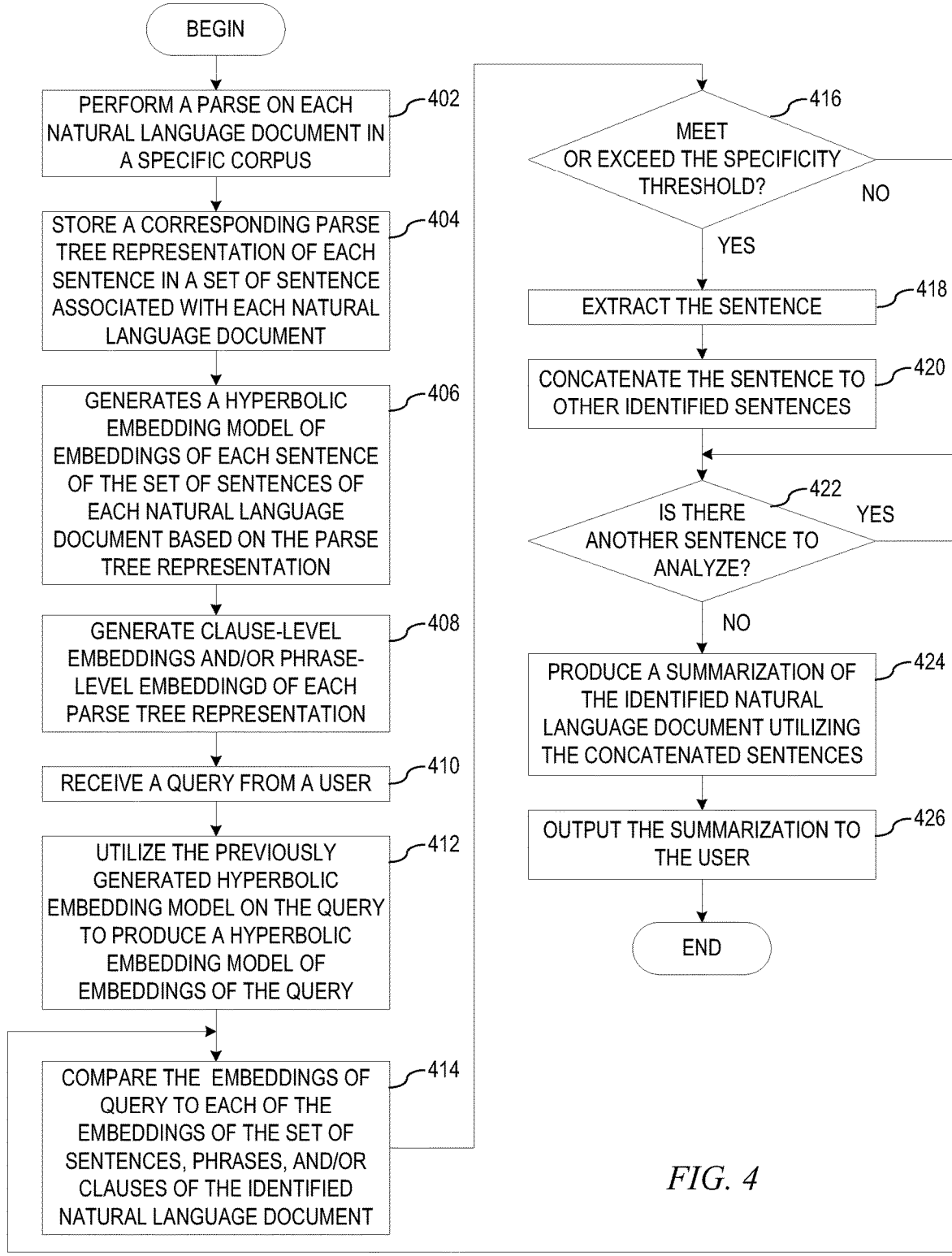
FIG. 4 depicts an exemplary flow diagram of an operation performed by a summarization mechanism that summarizes a natural language document using hyperbolic embeddings in accordance with an illustrative embodiment.

FIG. 4 depicts an exemplary flow diagram of an operation performed by a summarization mechanism that summarizes a natural language document using hyperbolic embeddings in accordance with an illustrative embodiment. As the operation begins, a parsing engine performs a parse on each natural language document in a specific corpus (step 402) and stores a corresponding parse tree representation of each sentence in a set of sentence associated with each natural language document in a storage (step 404). For each parse tree representation of the set of sentences of each natural language document, the hyperbolic embedding learning engine performs unsupervised hyperbolic embeddings training on natural language parse trees in parse tree representation of each of the set of sentences of each natural language document to generate a hyperbolic embedding model of embeddings of each sentence of the set of sentences of each natural language document (step 406). For each particular phrase and/or clause within the parse tree representation of each of the set of sentences the hyperbolic embedding learning engine performs unsupervised hyperbolic embeddings training on the particular phrase and/or clause in order to generate clause-level embeddings and/or phrase-level embeddings for query matching (step 408).

The summarization mechanism then receives a query from a user (step 410) that identifies a set of keywords or natural language phrase for which a summarization is to be produced as well as an identification of a particular natural language document of the natural language documents in the corpus for which the summarization is to be performed. Upon receiving the query, the hyperbolic embedding learning engine utilizes the previously generated hyperbolic embedding model associated with the identified natural language document on the query to produce a hyperbolic embedding model of embeddings for the query (step 412). Once the hyperbolic embedding model of the query is generated, a comparison engine compares the embeddings of query to each of the embeddings of the set of sentences, phrases, and/or clauses of the identified natural language document (step 414). In the comparison, the comparison engine identifies those embeddings of sentences, phrases, and/or clauses of the set of sentences of the identified natural language document that have a semantic specificity to the embeddings of the query within a specificity threshold (step 416).

If at step 416 the comparison engine identifies that a particular sentence, phrase, and/or clause of the set of sentences of the identified natural language document meets or exceeds the specificity threshold, then a summarization engine extracts the sentence (step 418) and concatenates the sentence to other identified sentences (step 420). The comparison engine then determines whether there is another sentence in the set of sentences of the identified natural language document to analyze (step 422). If at step 416 the comparison engine identifies that the sentence of the set of sentences of the identified natural language document fails to meet or exceed the specificity threshold, then the operating proceeds to step 422. If at step 422 there is another sentence in the set of sentences of the identified natural language document to analyze, the operation returns to step 414. If at step 422 there is no other sentence in the set of sentences of the identified natural language document to analyze, then the summarization engine produce a summarization of the identified natural language document utilizing the concatenated sentences (step 424) and outputs the summarization to the user (step 426), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for summarizing a natural language document using hyperbolic embeddings not only in the natural language document but hyperbolic embeddings in the received query. That is, the illustrative embodiment effectively inspects particular clauses within a sentence of the natural language document, using its representation in hyperbolic space, to evaluate its semantic similarity to a query received from a user, using its representation in hyperbolic space. The summarization mechanism may recognize a single clause out of a set of clauses as relevant to the query and thus, the summarization mechanism extracts the sentence comprising the clause. This approach goes beyond classification of sentences of the natural language document as either relevant or not relevant to a query because the summarization mechanism is, in principle, able to reason about the semantic content of sentences in order to recognize whether a particular clause of a sentence is related to a particular query and then extract that sentence in order to produce a summary that comprises the sentence.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to cause the at least one processor to be configured to implement a summarization mechanism for summarizing an identified natural language document using hyperbolic embeddings, the method comprising:

responsive to receiving a query from a user for a summarization of the identified natural language document, producing, by the summarization mechanism, a hyperbolic embedding model of first embeddings of the query;

comparing, by the summarization mechanism, the first embeddings to each second embedding of a set of second embeddings associated with a set of sentences of the identified natural language document;

for at least one second embedding of at least one portion of a sentence in the set of sentences, determining, by the summarization mechanism, whether the at least one second embedding has a semantic specificity to at least one first embedding equal to or above a specificity threshold, wherein the specificity threshold is a number of matches between second embeddings and first embeddings;

responsive to the at least one second embedding having a semantic specificity equal to or above the specificity threshold, adding, by the summarization mechanism, the sentence to a summary of the identified natural language document; and outputting, by the summarization mechanism, the summary to the user.

2. The method of claim 1, wherein the query from the user identifies a set of keywords or asset of natural language phrases for which a summarization is to be produced as well as an identification of the identified natural language document.

3. The method of claim 1, wherein the specificity threshold is defined by the user in the query.

4. The method of claim 1, wherein the specificity threshold is a dynamic threshold and wherein the dynamic threshold increases or decreases dynamically in order to meet a user defined length for the summary of the identified natural language document.

5. The method of claim 1, wherein the set of hyperbolic embedding models associated with the set of sentences of the identified natural language document is generated by the method comprising:

performing, by the summarization mechanism, a parse on each natural language document in an identified corpus;

generating, by the summarization mechanism, a corresponding parse tree representation of each sentence in a set of sentence associated with each natural language document; and for each parse tree representation of the set of sentences of each natural language document, performing, by the summarization mechanism, unsupervised hyperbolic embeddings training on each parse tree representation of each of the set of sentences of each natural language document to produce a hyperbolic embedding model of each sentence in the set of sentences or a phrase or clause within the sentence of the set of sentences of each natural language document.

6. A computer program product comprising a non-transitory computer readable storage medium having a computer readable program stored therein, wherein the computer readable program, when executed on a computing device, causes the data processing system to implement a summarization mechanism for summarizing an identified natural language document using hyperbolic embeddings, and further causes the computing device to:

responsive to receiving a query from a user for a summarization of the identified natural language document, produce, by the summarization mechanism, a hyperbolic embedding model of first embeddings of the query;

compare, by the summarization mechanism, the first embeddings to each second embedding of a set of second embeddings associated with a set of sentences of the identified natural language document;

for at least one second embedding of at least one portion of a sentence in the set of sentences, determining, by the summarization mechanism, whether the at least one second embedding has a semantic specificity to at least one first embedding equal to or above a specificity threshold, wherein the specificity threshold is a number of matches between second embeddings and first embeddings;

responsive to the at least one second embedding having a semantic specificity equal to or above the specificity threshold, add, by the summarization mechanism, the sentence to a summary of the identified natural language document; and output, by the summarization mechanism, the summary to the user.

7. The computer program product of claim 6, wherein the query from the user identifies a set of keywords or asset of natural language phrases for which a summarization is to be produced as well as an identification of the identified natural language document.

8. The computer program product of claim 6, wherein the specificity threshold is defined by the user in the query.

9. The computer program product of claim 6, wherein the specificity threshold is a dynamic threshold and wherein the dynamic threshold increases or decreases dynamically in order to meet a user defined length for the summary of the identified natural language document.

10. The computer program product of claim 6, wherein the set of hyperbolic embedding models associated with the set of sentences of the identified natural language document is generated by the computer readable program further causing the computing device to:

perform, by the summarization mechanism, a parse on each natural language document in an identified corpus;

generate, by the summarization mechanism, a corresponding parse tree representation of each sentence in a set of sentence associated with each natural language document; and for each parse tree representation of the set of sentences of each natural language document, perform, by the summarization mechanism, unsupervised hyperbolic embeddings training on each parse tree representation of each of the set of sentences of each natural language document to produce a hyperbolic embedding model of each sentence in the set of sentences or a phrase or clause within the sentence of the set of sentences of each natural language document.

11. An apparatus comprising:
at least one processor; and
at least one memory coupled to the at least one processor, wherein the at least one memory comprises instructions which, when executed by the at least one processor, cause the at least one processor to implement a summarization mechanism for summarizing an identified natural language document using hyperbolic embeddings, and further cause the at least one processor to:

responsive to receiving a query from a user for a summarization of the identified natural language document, produce, by the summarization mechanism, a hyperbolic embedding model of first embeddings of the query;

compare, by the summarization mechanism, the first embeddings to each second embedding of a set of second embeddings associated with a set of sentences of the identified natural language document;

for at least one second embedding of at least one portion of a sentence in the set of sentences, determining, by the summarization mechanism, whether the at least one second embedding has a semantic specificity to at least one first embedding equal to or above a specificity threshold, wherein the specificity threshold is a number of matches between second embeddings and first embeddings;

responsive to the at least one second embedding having a semantic specificity equal to or above the specificity threshold, add, by the summarization mechanism, the sentence to a summary of the identified natural language document; and output, by the summarization mechanism, the summary to the user.

12. The apparatus of claim 11, wherein the query from the user identifies a set of keywords or asset of natural language phrases for which a summarization is to be produced as well as an identification of the identified natural language document.

13. The apparatus of claim 11, wherein:
the specificity threshold is defined by the user in the query.

14. The apparatus of claim 11, wherein the specificity threshold is a dynamic threshold and wherein the dynamic threshold increases or decreases dynamically in order to meet a user defined length for the summary of the identified natural language document.

15. The apparatus of claim 11, wherein the set of hyperbolic embedding models associated with the set of sentences of the identified natural language document is generated by the instructions further causing the at least one processor to:

perform, by the summarization mechanism, a parse on each natural language document in an identified corpus;

generate, by the summarization mechanism, a corresponding parse tree representation of each sentence in a set of sentence associated with each natural language document; and for each parse tree representation of the set of sentences of each natural language document, perform, by the summarization mechanism, unsupervised hyperbolic embeddings training on each parse tree representation of each of the set of sentences of each natural language document to produce a hyperbolic embedding model of each sentence in the set of sentences or a phrase or clause within the sentence of the set of sentences of each natural language document.

* * * * *